United States Patent
Lortscher (12)

(10) Patent No.: US 6,624,990 B1
(45) Date of Patent: Sep. 23, 2003

(54) UNDERWATER LIGHT JUNCTION BOX HAVING A GFCI

(76) Inventor: Lane P. Lortscher, 18037 Martha St., Encino, CA (US) 91316

( * ) Notice: Subject to any disclaimer, the term of this patent is extended or adjusted under 35 U.S.C. 154(b) by 289 days.

(21) Appl. No.: 09/642,977

(22) Filed: Aug. 18, 2000

Related U.S. Application Data

(60) Provisional application No. 60/149,789, filed on Aug. 19, 1999.

(51) Int. Cl.$^7$ ................................................ H02H 9/08
(52) U.S. Cl. ...................................................... 361/42
(58) Field of Search ..................... 361/42, 107; 362/32, 362/267, 362

(56) References Cited

U.S. PATENT DOCUMENTS

| | | | | |
|---|---|---|---|---|
| 4,053,758 A | * | 10/1977 | Shaw | 362/158 |
| 4,234,819 A | * | 11/1980 | Maxey | 315/119 |
| 4,782,430 A | * | 11/1988 | Robbins et al. | 362/562 |
| 5,299,103 A | * | 3/1994 | Kielland | 362/101 |
| 6,241,361 B1 | * | 6/2001 | Thrasher et al. | 362/101 |
| 6,315,424 B1 | * | 11/2001 | Hui | 362/22 |
| 6,379,025 B1 | * | 4/2002 | Mateescu et al. | 362/293 |

* cited by examiner

Primary Examiner—Adolf D. Berhane
(74) Attorney, Agent, or Firm—Kelly Bauersfeld Lowry & Kelley, LLP

(57) ABSTRACT

The present invention provides an improved underwater light junction box which incorporates a ground fault circuit interrupter. The electrical junction box includes a cover and a ground fault circuit interrupter securely positioned between the cover and a base attachable to the cover. A switch of the ground fault circuit interrupter is aligned with a cover aperture and an overlying flexible, window. The ground fault circuit interrupter preferably has a bracket attached thereto for securing it to an inner surface of the side of the cover having the aperture to secure the ground fault circuit interrupter within the cover and properly align the switch with the cover's aperture. In order to retrofit an existing junction box so as to incorporate a ground fault circuit interrupter, the lid from the existing junction box is first removed. The electrical connections between the underwater illuminating light are disconnected from other electrical connections and connected to the ground fault circuit interrupter. A gasket is placed over the base and the cover is then secured to the base. In the event the base is nonconforming to the cover, an adapter plate having a predetermined number of apertures at predefined locations within the adapter plate is utilized.

20 Claims, 3 Drawing Sheets

UNDERWATER LIGHT JUNCTION BOX HAVING A GFCI

RELATED APPLICATION

This application claims priority from provisional application Ser. No. 60/149,789 filed Aug. 19, 1999.

BACKGROUND OF THE INVENTION

The present invention relates generally to underwater light, such as ground pool and spa light, junction boxes. More particularly, the present invention relates to the incorporation of a GFCI (ground fault circuit interrupt) into the pool light junction box for protection of pool and spa lights and prevention of electrocution of persons within the pool or spa.

When electrical applications are used in or around water it is imperative to minimize exposure to electrical shock or electrocution. A common exemplary combination is the installation and wiring of swimming pool lights, but similar needs are present with spa lights, fountains and other underwater applications.

Pool lights come with factory length cords of differing footage increments to meet electrical code requirements. A pool junction box is the point of electrical connection for the pool/spa lights and a switching device, such as a circuit breaker panel. The pool/spa light junction box is specially designed with a typically brass base having three holes in the bottom thereof to accept electrical conduit fittings which channel the electrical cords to the connection points. The center hole has a clamp fitting to hold in the pool light cord so that the cord is not accidently pulled out of the box and disconnected during light bulb changing. A top housing is screwed onto the base to protect the wires from the environment and the like. The housing is sized to accommodate for the internal wiring, splicing clamps and switches if present.

Until recent years pool lights were not required to GFCI protected. As technology has improved, GFCI protection is now required by the NEC (national electrical code). Several politicians are also advocating that earlier pools and spas and the like be required to be retrofitted to include such GFCI protection. For example, a California legislator is advocating a bill which would require apartments and hotels install GFCI switches in their pre-1975 pools. Similar bills for residential pools are also being considered.

The method of GFCI protecting a light is very time consuming. This is particularly so when updating existing junction boxes. Due to the complexity and time involved in updating existing junction boxes, it has been found to be fairly expensive, typically in excess of $500 per box. Traditionally the GFCI pool light protection has been placed such that it is difficult to access for testing purposes. Installing the GFCI at a remote location also makes it difficult to recognize as the light protection device.

Accordingly there is a need for a novel GFCI protection device for underwater lighting which is simplified in its installation and application. Such a light protection device should be capable of not only being newly installed, but also installed in existing pool boxes without total replacement of the junction box regardless of the design of the box. The present invention fulfills these needs and provides other related advantages.

SUMMARY OF THE INVENTION

The present invention resides in an improved underwater light junction box which provides and/or incorporates a ground fault circuit interrupter. Aside from providing a ground fault circuit interrupter which can prevent electrocution, the present invention reduces the cost and complexity of installing new junction boxes having a ground fault circuit interrupter and retrofitting existing underwater junction boxes to include a ground fault circuit interrupter.

In general, the electrical junction box of the present invention comprises a cover and a ground fault circuit interrupter securely positioned between the cover and a base attachable to the cover. The base has apertures through a bottom surface thereof for the acceptance of electrical cords from the water illuminating light. These electrical cords are electrically connected to the ground fault circuit interrupter.

In a preferred embodiment, the cover has an aperture formed through one side thereof. A flexible window is fixed to the cover so as to extend across and cover the aperture to prevent moisture from entering the cover. Typically, the window is fixed to the cover on an inner surface thereof using double-sided adhesive tape. The ground fault circuit interrupter typically includes a switch having a reset and test switches. The switch of the ground fault circuit interrupter is aligned with the cover aperture. The ground fault circuit interrupter preferably has a bracket attached thereto for securing it to the inner surface of the side of the cover having the aperture to secure the ground fault circuit interrupter within the cover and properly align the switch with the cover's aperture.

In order to retrofit an existing junction box so as to incorporate a ground fault circuit interrupter, the lid from the existing junction box is first removed. The electrical connections between the underwater illuminating light are disconnected from other electrical connections and connected to the ground fault circuit interrupter. The cover is then secured to the base.

A gasket is preferably placed between the cover and the base to create a waterproof seal. In the event the base is nonconforming to the cover, for instance the base is either larger or smaller than the cover, an adapter plate having a predetermined number of apertures at predefined locations within the adapter plate is utilized. The adapter plate is first attached to the base and the gasket and cover are then attached to the adapter plate so as to secure the cover to the base.

Other features and advantages of the present invention will become apparent from the following more detailed description taken in conjunction with the accompanying drawings which will illustrate, by way of example, the principles of the invention.

BRIEF DESCRIPTION OF THE DRAWINGS

The following drawings illustrate the invention. In the following drawings.

DETAILED DESCRIPTION OF THE PREFERRED EMBODIMENTS

Figure 1:
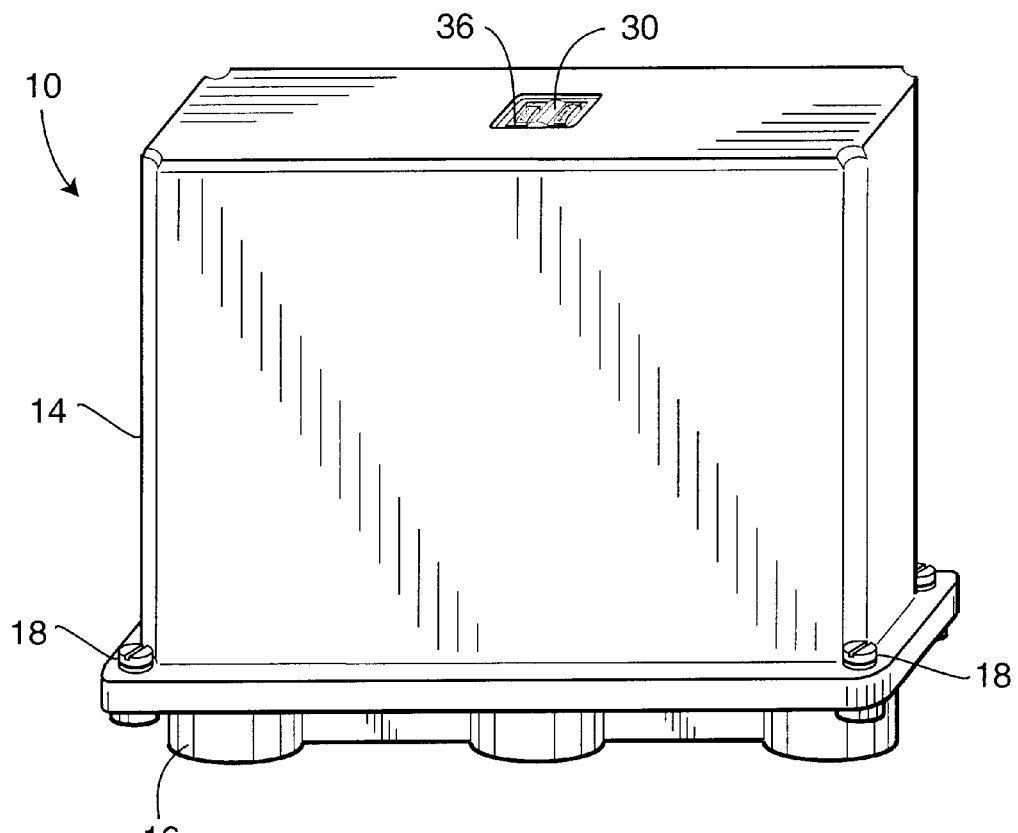
FIG. 1 is a perspective view of an assembled junction box embodying the present invention.

As shown in the drawings for purposes of illustration, the present invention is concerned with an improved underwater light wiring compartment junction box, generally designated in the accompanying drawings by the reference number 10, which is designed to incorporate a ground fault circuit interrupter (GFCI) 12. The GFCI 12 is a safety device that protects the underwater light and persons within the area or in the water from potential shock or electrocution. The junction box 10 is configured so that it is capable of being used in almost all applications. The junction box 10 of the present invention may be retrofit to many existing applications and is useful in all new applications, eliminating unnecessary and time consuming applications and installations. The junction box 10 for the underwater lights is easily identified, which is beneficial not only to the owner but also to building and safety inspector personnel.

Figure 2:
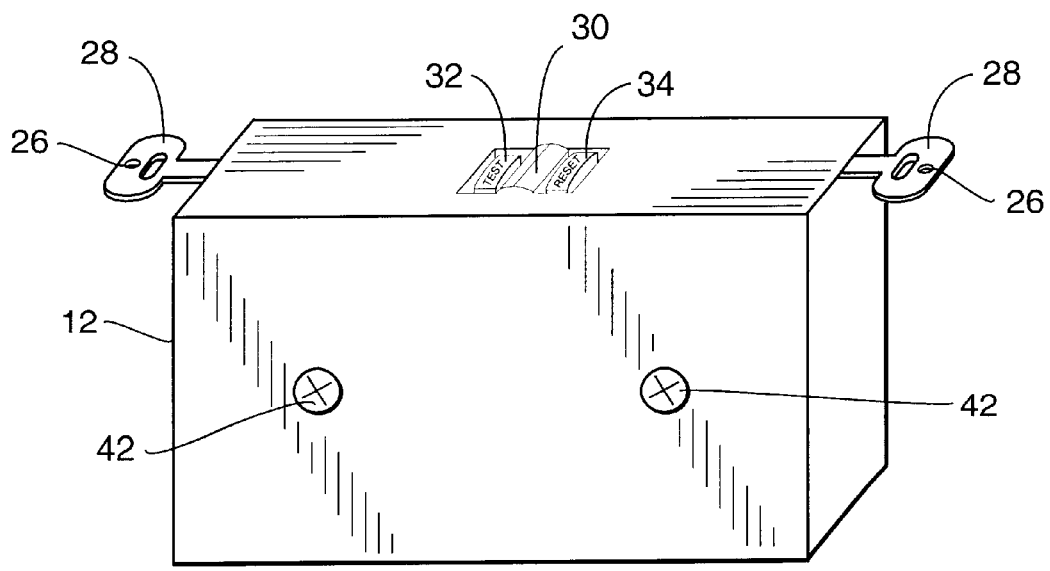
FIG. 2 is a perspective view of a ground fault circuit interrupter used in accordance with the present invention.

Referring to FIGS. 1 and 2, in its simplest form, the invention comprises a cover 14 which is sized to accommodate the applicable wires for splicing and a GFCI 12 securely positioned between the cover 14 and a base 16. A typical underwater lighting junction box lid is typically too small to contain both the spliced wires and the GFCI 12 therein. Therefore, the cover 14 of the present invention is enlarged so that its inner cavity is able to accommodate both of these items. The cover 14 is preferably composed of a heavy plastic material which is waterproof and sunlight resistive, although it is not limited to such. As seen in the accompanying drawings, the cover 14 is typically rectangular in shape with a major vertical axis to accommodate not only the GFCI 12, but also to meet National Electrical Code (NEC) requirements.

The cover 14 is securely attachable to the base 16 with screws 18, such as 10–24 screws, which extend through the cover 14 to pre-drilled apertures 20 in an outer flange 22 or the like of the base 16. The base 16 is typically comprised of brass. The invention can include the base 16, or the base of an existing junction box can be used to retrofit the existing junction box as will be further explained.

Figure 3:
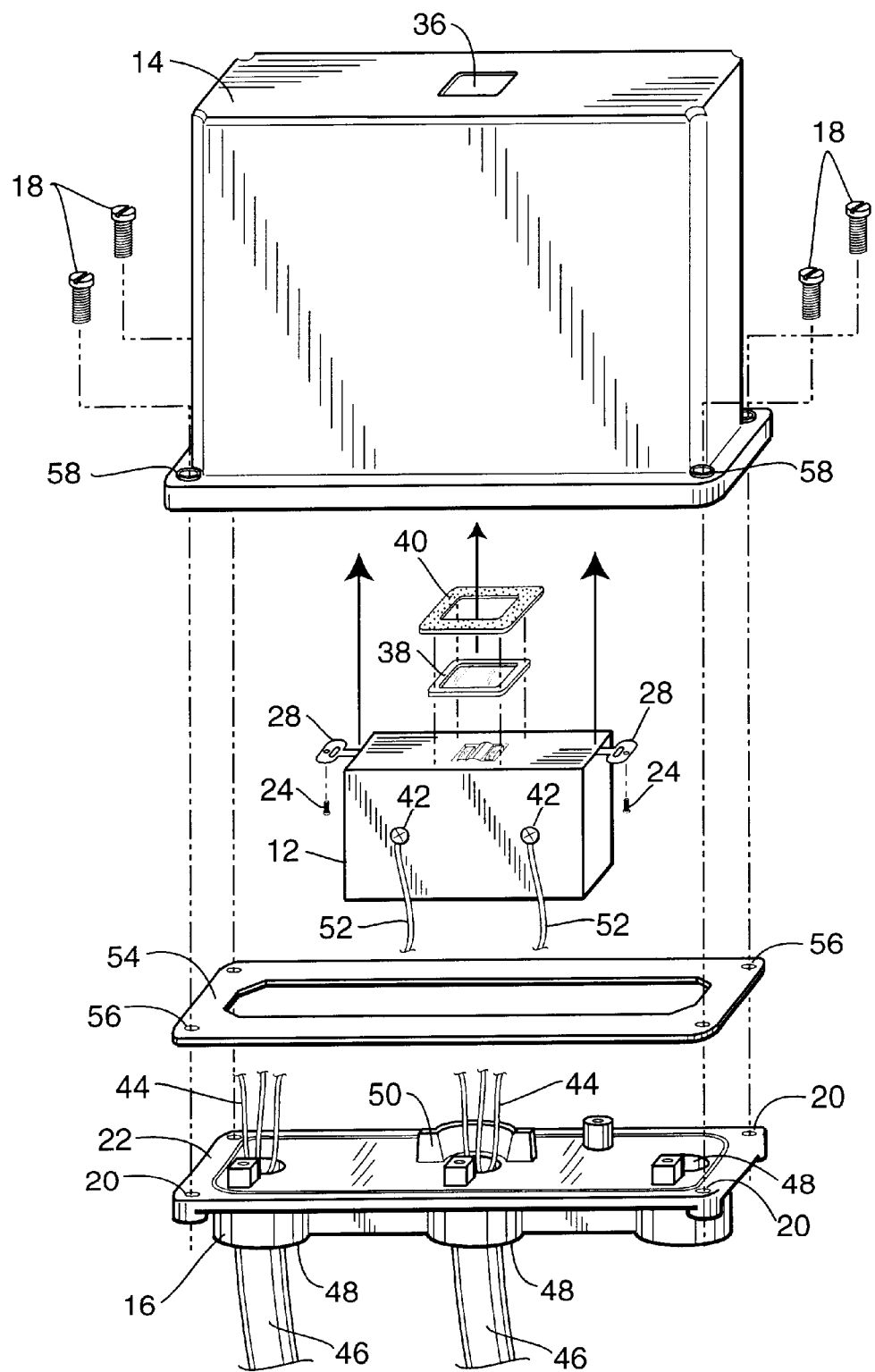
FIG. 3 is an exploded view of a junction box embodying the present invention, illustrating the several components thereof.

Referring now to FIG. 3, the GFCI 12 is typically secured to the inner surface of the cover 14 with screws 24, typically No. 8, ⁵⁄₁₆" course screws, which extend through apertures 26 of a bracket 28 attached to the GFCI 12 and into screw slots (not shown) formed on an inner surface of the cover 14. The GFCI 12 includes a test/reset switch 30 which allows one to test the functionality of the GFCI 12 by pressing a test button 32 to trip the GFCI 12 into an open circuit arrangement, and then resetting the switch 30 by pressing a reset button 34 to close the GFCI 12 into a working condition. It is recommended that the GFCI 12 be tested periodically, preferably once a month, to ensure that it is operating.

In a particularly preferred form of the invention illustrated in the accompanying drawings, an aperture 36 is formed in a side surface, typically the top surface, of the cover 14. This aperture 36 is sized such that the GFCI switch 30 can be accessed from outside of the junction box 10. Typically, the aperture 36 is approximately ¾"×¾ in size. In order to prevent moisture from entering the box 10, and also to pass Underwriters Laboratories™ (UL) certification, a flexible window 38 is fixed over the aperture 36. The window 38 may be fixed over the aperture 36 by many methods including the use of two sided adhesive tape 40 placed between the aperture 36 and the window 38. When the GFCI 12 is screwed into place in the cover 14, the surface of the GFCI typically presses the tape 40 and window 38 against the inner surface of the cover 14 until the switch 30 is easily accessible through the flexible window 38 from outside of the cover 14.

The GFCI 12 includes electrical contacts, typically in the form of metal screws 42, which are used to electrically connect wires 44 extending from cords 46 of the power source and underwater light. The base 16 includes conduit apertures 48 for extending the cords 46 through the base 16 and into the junction box 10. Typically, the underwater light cord 46 is extended through a center conduit aperture 48 which includes a clamp 50 for preventing the cord 46 from being accidently pulled from the junction box 10 and electrically disconnected when the underwater light is repaired or otherwise manipulated. These cords 46 are typically housed within conduit piping (not shown) upon which the base 16 rests.

When newly installing the junction box 10, the cover 14 is removed to expose the GFCI 12 and the base is properly positioned over and connected to the conduit piping. The cords 46 are threaded through the base apertures 48. The cord wires 44, typically three, are exposed for connection to the GFCI electrical contactors. As described above, these connectors are typically screws 42 which make electrical contact with the GFCI 12. Electrical leads 52 can extend from these contactor screws 42 for facile splicing with the cord wires 44. There are usually five leads 52 extending from the GFCI 12. A green lead is grounded to the base 16. A gray lead is spliced to a neutral white wire of the pool light cord. A red lead is electrically spliced to a black load wire of the pool light cord. A white lead is spliced or otherwise connected to a neutral white wire from a power panel cord. A black lead is connected to a hot leg, typically black wire, from the power panel. Other wires from another underwater light source, such as an underwater spa light, may also be electrically connected in a similar fashion. Those skilled in the art will understand which wires are to be connected to which leads or contactors if they vary from the given description. The GFCI 12 is then tested once power is restored to ensure its operation.

The cover 14 is then placed over the base 16. A gasket 54, preferably formed of rubber or the like, is typically placed between the base 16 and cover 14 so as to create a waterproof seal therebetween. The gasket 54 includes apertures 56 which align with cover apertures 58 and the screws 18 are inserted through the cover 14 and gasket 54. and into the pre-drilled base apertures 20.

Although the cover 14 and gasket 54 are sized and configured to match the most widely used base 16 (as illustrated in FIG. 3), when retrofitting existing junction boxes, the base may be of a different configuration or size so as not to be compatible with the cover 14 and gasket 54.

Figure 4:
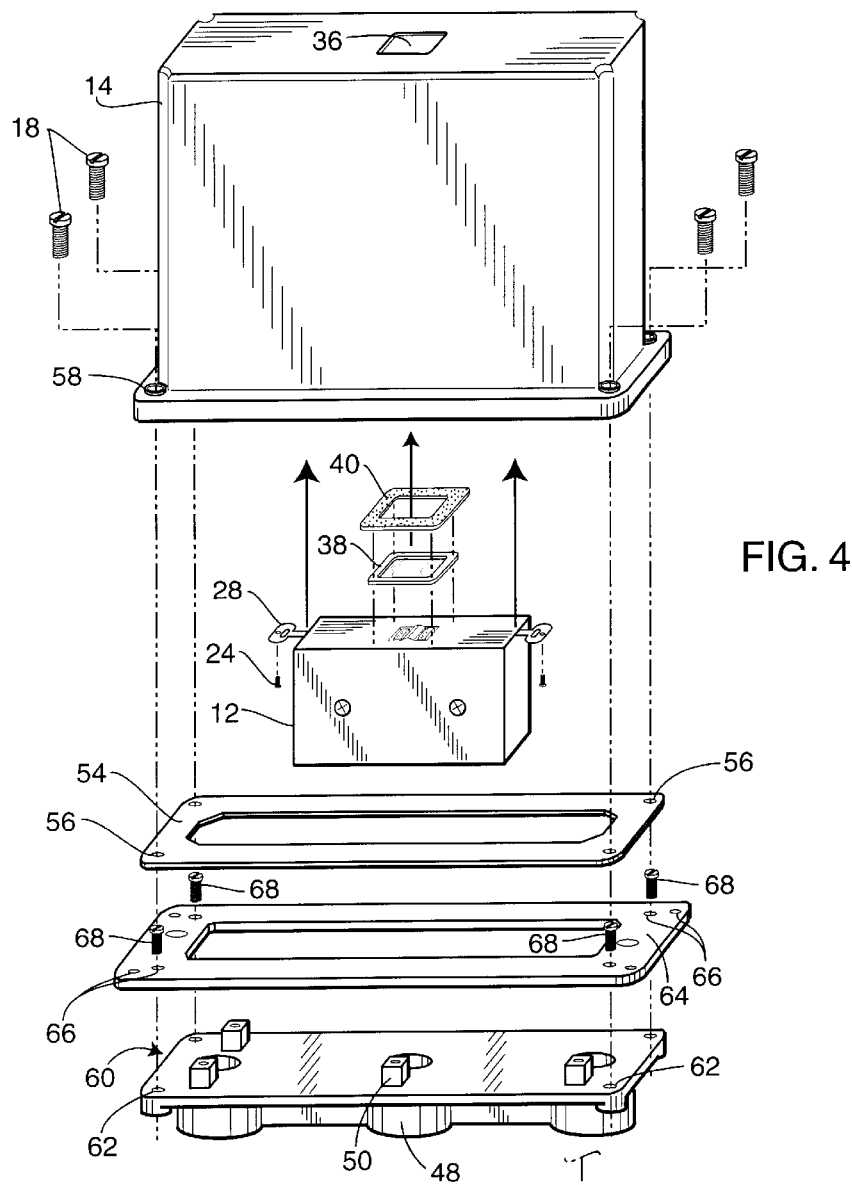
FIG. 4 is an exploded view of another junction box embodying the present invention having an adapter plate for connecting a cover to a non-conforming base.
Figure 5:
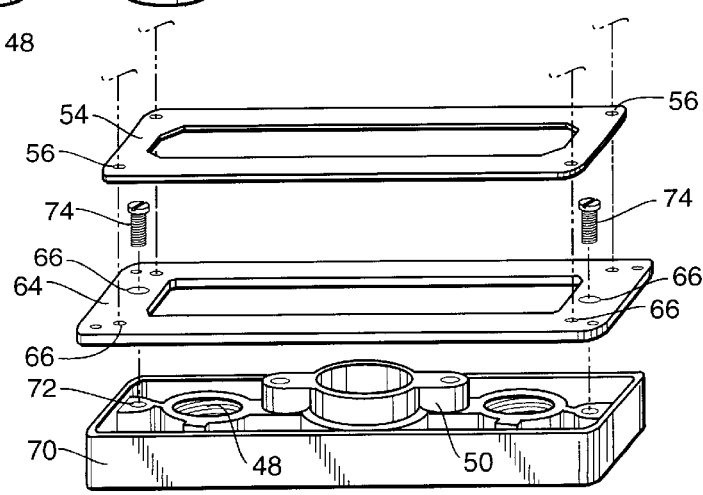
FIG. 5 is an exploded view of another base being connected to the adapter plate of FIG. 4.

With reference to FIGS. 4 and 5, the same essential components of the present invention are used with an existing base, designated by the reference number 60 in FIG. 4. The existing base 60 is most likely brass and includes the conduit apertures 48 and clamp 50. However, the base 60 is smaller than the cover 14 and thus the cover apertures 58 and gasket apertures 54 do not align with the pre-drilled holes 62 of the existing base 60. Thus, prior to making the proper electrical connections, as described above, an adapter plate 64 having a predetermined number of apertures 66, typically five on each side, is placed between the gasket 54 and the base 60. The adapter plate 64 is typically comprised of a hard plastic, such as polycarbonate or the like, but can be formed from. other materials as well. Screws 68 are inserted into inner apertures of the adapter plate 64 and into the base holes 62 to secure the adapter plate 64 thereto. The cover and gasket apertures 56 and 58 are then aligned with the outer apertures 66 of the adapter plate 64 and screws 18 are threaded through each of the aligned apertures to secure the cover 14 to the base 60. The old lid is discarded as it cannot accommodate the GFCI 12 under NEC requirements or UL specifications.

FIG. 5 illustrates the same concept using the adapter plate 64 to attach the cover 14 to yet another base 70 having two offset pre-drilled holes 72. Screws 74 are inserted through the appropriately placed apertures 66 which align with the pre-drilled holes 72, and then the cover 14 and gasket 54 attached through other adapter plate apertures 66 as previously described.

With the adapter plate 64, the vast majority of existing junction boxes in use, approximately 90%, can be retrofitted with the present invention to incorporate a GFCI 12.

From the foregoing it is to be appreciated that the present invention provides a highly reliable, simplified method by which a GFCI switch 12 can be incorporated into a underwater junction box for effectively prohibiting electrical shock from being incurred. This is true whether the underwater light junction box is being utilized in new construction or for retrofitting existing boxes in the field. The junction box 10 of the present invention includes a minimum number of parts which are configured to be easily joined to one another greatly simplifying the installation of the GFCI protection switch. In fact, the cost of installing a GFCI can be reduced from the estimated $500 to less than $100. Moreover, the junction box location is easily identifiable as the safety feature for the underwater light. Furthermore, the use of the flexible window allows for the convenient testing of the GFCI.

Although several embodiments of the invention have been described in detail for purpose of illustration, various modifications may be made without departing from the spirit and the scope of the invention. Accordingly, the invention is not to be limited, except as by the appended claims.

What is claimed is:

1. An electrical junction box for electrically connecting a submersed water illuminating light, comprising:
   a cover; and
   a ground fault circuit interrupter securely positioned between the cover and a base attachable to the cover, the ground fault circuit interrupter being connectable to electrical leads from the submersed water illuminating light and an external power source which extend through apertures formed in a bottom surface of the base.

2. The electrical junction box of claim 1, wherein the cover has an aperture formed through one side thereof.

3. The electrical junction box of claim 2, including a flexible window fixed to the cover so as to extend across the aperture.

4. The electrical junction box of claim 3, wherein the flexible window is fixed to the inner surface of the cover with two sided adhesive tape.

5. The electrical junction box of claim 1, wherein the ground fault circuit interrupter includes a switch.

6. The electrical junction box of claim 5, wherein the switch includes a test switch and a reset switch.

7. The electrical junction box of claim 5, wherein the switch is aligned with the cover aperture.

8. The electrical junction box of claim 7, wherein the ground fault circuit interrupter has a bracket attached thereto for securement of the ground fault circuit interrupter to the inner surface of the side of the cover having the aperture therethrough.

9. The electrical junction box of claim 1, including a gasket placed between the cover and the base for creating a waterproof seal therebetween.

10. The electrical junction box of claim 1, including an adapter plate having a predetermined number of apertures at predefined locations so as to attach the cover to a nonconforming base.

11. An electrical junction box for electrically connecting submersed water illuminating lights, comprising:
   a cover having an aperture formed through one side thereof;
   a flexible window fixed to the cover so as to extend across the aperture and prevent moisture from leaking therethrough;
   a ground fault circuit interrupter having a switch securely positioned within the cover so that the switch is aligned with the flexible window and aperture;
   a base having apertures through a bottom surface thereof for the acceptance of electrical cords from the submersed water illuminating lights for electrically connecting the water illuminating light to the ground fault circuit interrupter; and
   a gasket placed between the cover and the base for creating a waterproof seal therebetween.

12. The electrical junction box of claim 11, wherein the flexible window is fixed to the inner surface of the cover with two sided adhesive tape.

13. The electrical junction box of claim 11, wherein the switch includes a test switch and a reset switch.

14. The electrical junction box of claim 11, wherein the ground fault circuit interrupter has a bracket attached thereto for securement of the ground fault circuit interrupter to the inner surface of the side of the cover having the aperture therethrough.

15. The electrical junction box of claim 11, including an adapter plate having a predetermined number of apertures at predefined locations so as to attach the cover to a nonconforming base.

16. A process for retrofitting an underwater lighting electrical junction box so as to incorporate a ground fault circuit interrupter, comprising the steps of:
   removing a lid of an existing underwater lighting electrical junction box from its base;
   disconnecting electrical connections to an underwater illuminating light cord;
   connecting the electrical connections of the underwater illuminating light cord to a ground fault circuit interrupter secured within a cover; and
   securing the cover to the base.

17. The process of claim 16, wherein the securing step includes the step of attaching an adapter plate to the base and then attaching the cover to the adapter plate when the base does not conform to the cover.

18. The process of claim 16, including the step of placing a gasket between the cover and the base to create a waterproof seal therebetween.

19. The process of claim 16, wherein the cover includes an aperture through a surface thereof which is sized to encompass a test/reset switch of the ground fault circuit interrupter.

20. The process of claim 19, wherein a flexible window is fixedly interposed between the switch and the aperture to prevent moisture from entering the cover.

* * * * *